United States Patent [19]  [11] Patent Number: 5,075,924
Estkowski et al.  [45] Date of Patent: Dec. 31, 1991

[54] TILTED AXLE MULTIPLE WHEEL CASTER

[75] Inventors: Michael H. Estkowski, St. Joseph; Christopher G. Estkowski, Coloma, both of Mich.

[73] Assignee: Shepperd Products U.S., Inc., St, Joseph, Mich.

[21] Appl. No.: 634,444

[22] Filed: Dec. 27, 1990

[51] Int. Cl.⁵ ............................................. B60B 33/00
[52] U.S. Cl. .................................... 16/18 A; 16/47
[58] Field of Search ............... 16/18 A, 18 R, 46–48, 16/97; 301/5.3; 280/11.19, 28.5, 32.6; 312/250; 297/5; 5/510

[56] References Cited

U.S. PATENT DOCUMENTS

| | | | |
|---|---|---|---|
| 1,160,121 | 11/1915 | Allen | 16/48 |
| 1,617,984 | 2/1927 | Biggio | 301/5.3 |
| 3,140,506 | 7/1964 | Arenson | 16/47 |
| 3,141,711 | 7/1964 | Biedinger | 384/533 |
| 3,177,516 | 4/1965 | Price et al. | 16/18 A |
| 3,186,025 | 6/1965 | Kesterton . | |
| 3,243,194 | 3/1966 | Trusock | 280/43.12 |
| 3,892,447 | 7/1975 | Gruber et al. | 384/576 |
| 3,920,293 | 11/1975 | Takeuchi | 384/129 |
| 3,991,434 | 11/1976 | James | 16/18 A |
| 4,069,543 | 1/1978 | James | 16/18 R |
| 4,161,803 | 7/1979 | Propst et al. | 16/18 A |
| 4,432,659 | 2/1984 | Tuckey | 384/300 |
| 4,603,982 | 8/1986 | Dittrich | 384/129 |
| 4,752,986 | 6/1988 | Rivkin et al. | 16/18 A |
| 4,911,269 | 3/1990 | Perl . | |

FOREIGN PATENT DOCUMENTS

| | | | |
|---|---|---|---|
| 658552 | 2/1963 | Canada | 5/510 |
| 61-200003 | 9/1986 | Japan | 16/47 |
| 719 | of 1876 | United Kingdom | 280/11.19 |
| 239701 | 9/1925 | United Kingdom | 16/18 A |

Primary Examiner—Robert L. Spruill
Attorney, Agent, or Firm—Lee, Mann, Smith, Mc Williams & Sweeney

[57] ABSTRACT

A caster for supporting an article of furniture and for rolling over a surface including a body having a first axle and a second axle with the first axle being disposed at an angle to a second axle and the first and second axles being disposed at acute angles to the surface. Two or more wheels are mounted for rotation about the first axle with each wheel being relatively rotatable with respect to each other wheel. Two or more wheels are also mounted for rotation about the second axle with each wheel being relatively rotatable with respect to each other wheel.

9 Claims, 2 Drawing Sheets

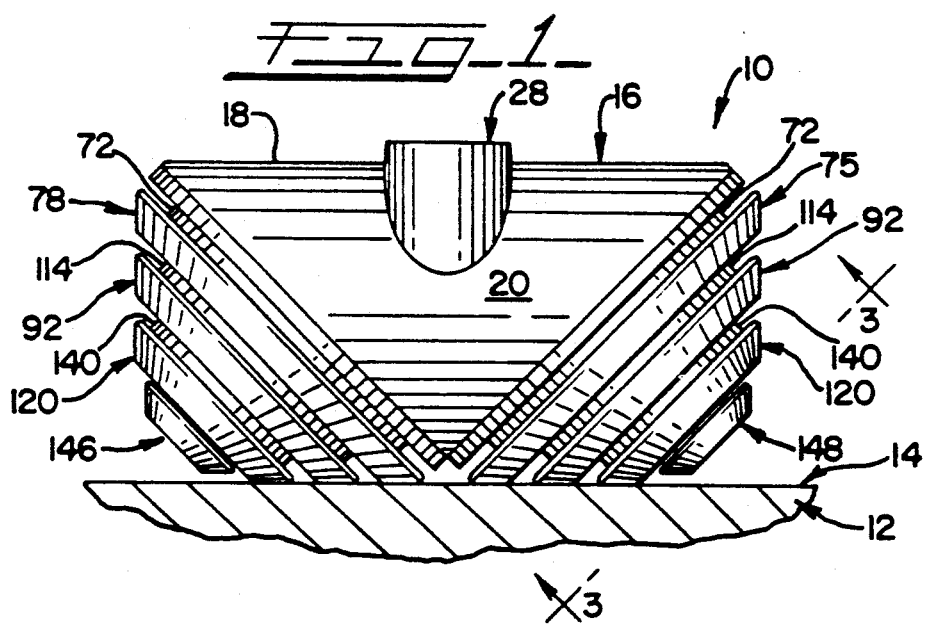
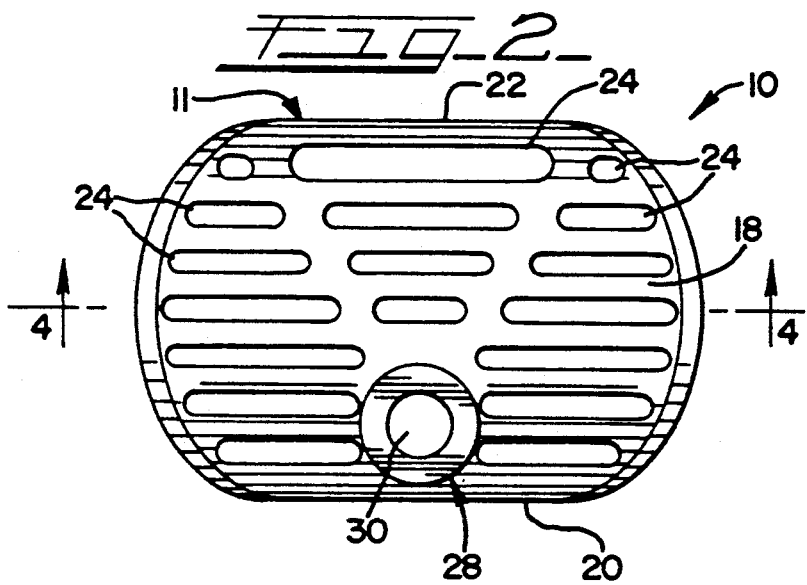

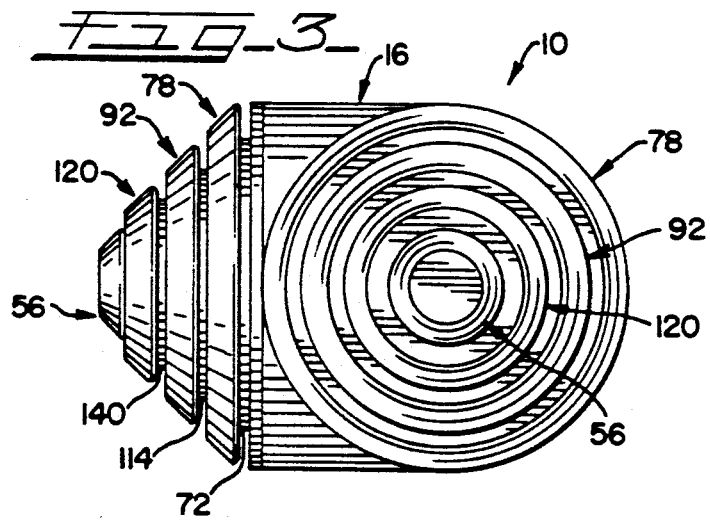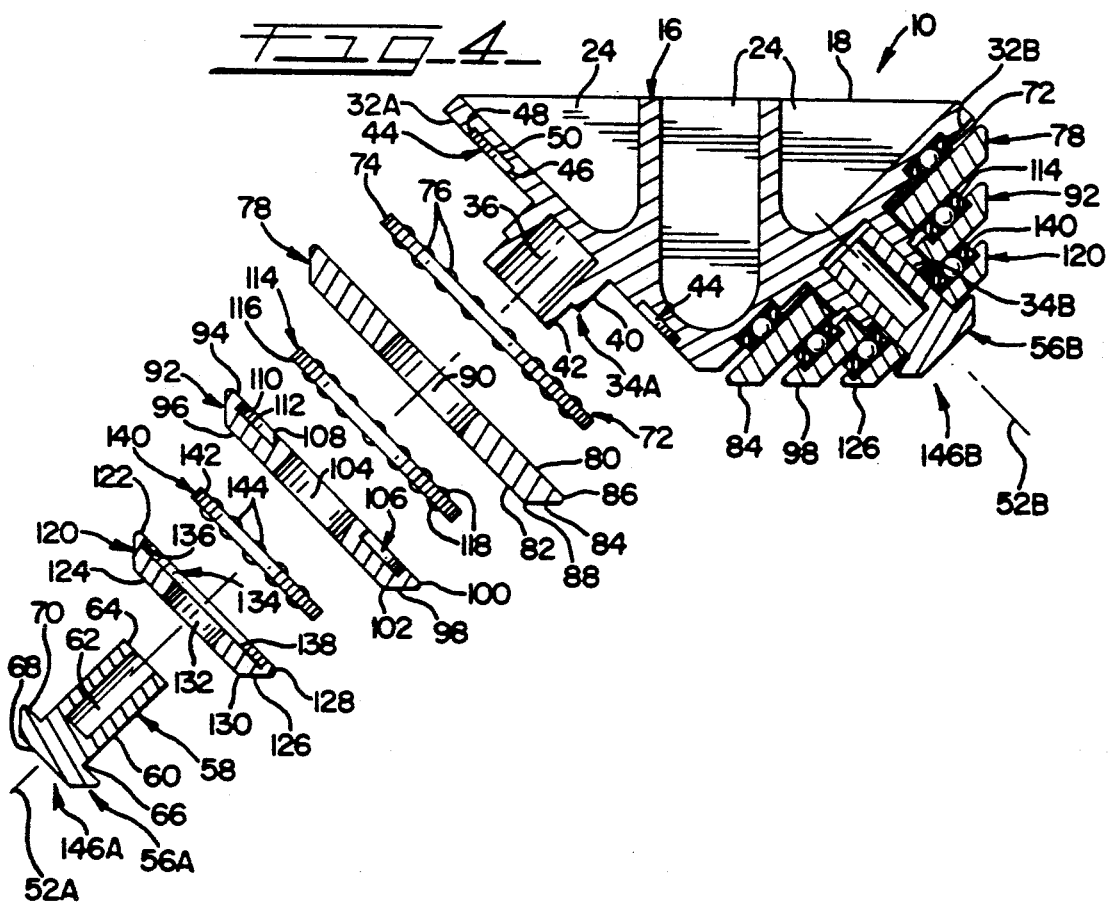

TILTED AXLE MULTIPLE WHEEL CASTER

BACKGROUND OF THE INVENTION

The present invention relates to casters and in particular to casters which include wheels that are rotatable about a tilted or inclined axle. Casters of this type are used to support articles of furniture such as chairs for rolling over rugs or other flooring surfaces.

It has been found desirable to provide such a caster with one frusto-conical shaped wheel rotatably attached to each respective axle. Such a caster provides a low profile and a wide footprint such that the depression of the wheels into the surface will be minimized. These and other advantages of having a single frusto-conical shaped wheel rotatably attached to a single tilted axle are discussed in Rivkin et al. U.S. Pat. No. 4,752,986. The wheels used in Rivkin et al. include a frusto-conical shaped floor engaging surface which extends between an inner rim, having a relatively large diameter, and an outer rim having a relatively small diameter.

While such a design provides the desired wide footprint characteristic, the frusto-conical surface of the wheels shown in the Rivkin et al. patent will slip or drag on the floor surface as the caster is moved in a linear direction. The slipping or dragging of the wheels in the Rivkin et al. caster is due to the large difference in the diameters of the inner and outer rim of each wheel which results in a large difference in the length of the respective circumferences of the inner rim and of the outer rim. For example, when the Rivkin et al. caster is moved in a linear direction a distance equal to the circumference the larger inner rim, the inner rim will have made one complete revolution. Since the inner rim and outer rim are connected, the outer rim will also have made one complete revolution. However, since the outer rim has a smaller circumference than the inner rim, one revolution of the outer rim will not cover the same distance as one revolution of the inner rim. Therefore the outer rim must be partially rotated on, and partially dragged along, the floor surface. In the converse situation, if the caster moves a distance equal to the circumference of the outer rim and the outer rim has made one revolution, the inner rim must partially rotate on the surface and must partially slip or slide along the floor surface to keep pace with the outer rim. Such dragging or slipping by the wheels causes marring of the floor surface which is aesthetically undesirable and which can also damage the surface. The dragging and slipping of the wheel also impedes the overall ease of movement of the caster.

SUMMARY OF THE INVENTION

The present invention provides a caster for supporting an article of furniture for rolling along a floor engaging surface. The caster includes a body having a first axle and a second axle, with the first axle being disposed at an angle to the second axle and with the first and second axles being disposed at acute angles to the surface. A plurality of frusto-conical shaped wheels are rotatably mounted to each respective axle such that each wheel is independently rotatable with respect to the axle and each other. Each wheel includes an inner rim and an outer rim which are relatively close in diameter to eliminate the slipping or dragging of the floor engaging surface of each wheel as the caster moves along the floor surface. A plurality of wheels are mounted on each axle to provide a wide footprint for the caster and thereby minimize the creation of depressions in the surface. Antifriction bearings are used to reduce friction between the wheels and with the caster body.

DESCRIPTION OF THE DRAWINGS

FIG. 1 is a front elevational view of the caster shown in engagement with a flooring surface.

FIG. 2 is a top plan view of the caster.

FIG. 3 is an end view of the caster taken along lines 3—3 of FIG. 1.

FIG. 4 is a cross sectional view taken along lines 4—4 of FIG. 2 showing the left half of the caster in an exploded view.

DESCRIPTION OF THE PREFERRED EMBODIMENT

A caster generally designated as 10 is shown in FIG. 1 in engagement with a floor 12 having a surface 14. The caster 10 includes a body 16 having a rounded top surface 18, a rounded front surface 20, and a rounded rear surface 22. The top surface 18 includes a plurality of grooves 24 as shown in FIG. 2 which are provided primarily for aesthetics but which also serve to reduce the weight of the caster. A pivot sleeve 28 having a bore 30 extends upwardly from the top surface 18 and is located near the front surface 20. The pivot sleeve 28 and the bore 30 are adapted to receive a stem (not shown) for mounting the caster 10 on a piece of furniture or other article to be supported.

As best shown in FIG. 4, the body 16 also includes an inclined surface 32A at the left side and an inclined surface 32B at the right side. The surfaces 18-22 extend between the surfaces 32A and 32B. The inclined surfaces 32A and 32B are disposed at an angle to each other which is shown as 90°, however other angles may be used as desired. Each inclined surface 32A and 32B respectively includes a stem 34A and 34B. Each stem 34 includes a hollow cylindrical chamber 36. The stem 34 is stepped to form a first circular collar 40, which is adjacent to the inclined surface 32, and a second circular collar 42 which is located outwardly from the first collar 40 with respect to the body 16. Each inclined surface 32A and 32B also includes a circular race 44. Each race 44 includes an inner wall 46, an outer wall 48 and a bottom wall 50. Each race 44 is concentrically located about a respective left axis 52A and a right axis 52B. The left axis 52A extends perpendicular to the inclined surface 32A and passes through the center of the stem 34A and the inclined surface 32A. The right axis 52B is perpendicular to the inclined surface 32B and passes through the center of the stem 34B and the inclined surface 32B.

The caster 10 also includes two pins 56A and 56B which are insertable into a respective stem 34A and 34B. Each pin 56 includes a cylindrical shaft 58 having an outer surface 60 and a hollow cylindrical chamber 62. The shaft 58 extends between a first end 64 and a second end 66. A head 68 is attached to the second end 66 of the shaft 58. The head 68 includes a flange 70 which extends outwardly from the shaft 58. The outer diameter of the shaft 58 is sized so that the pin 56 may be press fit into the chamber 36 of the stem 34 and be non-rotatably secured therein. An adhesive may be additionally used to fix the pin 56.

A ball bearing assembly 72 is located in each race 44. The bearing assembly 72 secured therein includes a retaining ring 74 and a plurality of spherical balls 76 located within the retaining ring 74 such that the balls 76 will simultaneously extend from each side of the retaining ring 74.

Each side of the caster 10 includes a wheel 78 which is respectively located concentrically around each stem 34. The wheel 78 includes an inner surface 80 and an outer surface 82. Each wheel 78 includes a surface engaging radial outer surface 84. An inner rim 86 is formed between the inner surface 80 and the radial surface 84 and an outer rim 88 is formed between the outer surface 82 and the radial surface 84. The diameter of the inner rim 86 is slightly larger than the diameter of the outer rim 88. The radial surface 84 tapers uniformly inward from the inner rim 86 to the outer rim 88. Each wheel 78 also includes a bore 90 which extends through the center from the outer surface 82 to the inner surface 80. The diameter of the bore 90 is sized so that it is slightly larger than the diameter of the first collar 40 so that there will be a sliding fit between the two allowing the wheel 78 to rotate about the stem 34. The wheel 78 is placed around the stem 34 such that the first collar 40 is located within the bore 90 and such that the wheel 78 is located adjacent to the bearing 72 whereby the wheel 78 is rotatably engaged against the inclined surface 32 and around the collar 40.

A wheel 92 is also rotatably mounted on each respective stem 34. The wheel 92 includes an inner surface 94 and an outer surface 96. The wheel 92 also includes a radial surface 98. The intersection of the inner surface 94 and the radial surface 98 forms an inner rim 100 and the intersection of the outer surface 96 and the radial surface 98 forms an outer rim 102. The diameter of the inner rim 100 is slightly larger than the diameter of the outer rim 102. The radial surface 98 tapers uniformly from the inner rim 100 inwardly to the outer rim 102. The diameter of the inner rim 100 of the wheel 92 is smaller than the diameter of the outer rim 88 of the wheel 78. The wheel 92 also includes a bore 104 which extends from the outer surface 96 to the inner surface 94. The diameter of the bore 104 is slightly larger than the diameter of the second collar 42 of the stem 34. Each wheel 92 also includes a circular race 106 which is located on the inner surface 94 concentrically around the bore 104. The race 106 includes an inner wall 108, an outer wall 110 and a backwall 112. A bearing assembly 114 including a retaining ring 116 and a plurality of spherical balls 118 located within the retaining ring 116 is located within the race 106 and between the wheel 78 and the wheel 92. The wheel 92 is placed around the stem 34 such that the bore 104 is located around the second collar 42 and such that the wheel 92 is located adjacent to the wheel 78 whereby the wheel 92 is rotatably engaged with the wheel 78 and rotatable around the collar 42.

The caster 10 also includes a wheel 120 respectively located about each stem 34. Each wheel 120 includes an inner surface 122 and an outer surface 124. Each wheel 120 also includes a radial surface 126. The inner surface 122 and the radial surface 126 form an inner rim 128 and the outer surface 124 and the radial surface 126 form an outer rim 130. The inner rim 128 is slightly larger in diameter than the outer rim 130 and the inner rim 128 is smaller in diameter than the outer rim 102 of the wheel 92. The radial surface 126 tapers uniformly from the inner rim 128 inwardly to the outer rim 130. The wheel 120 also includes a circular bore 122 which extends through the wheel 120 from the outer surface 124 to the inner surface 122. Each wheel 120 also includes a race 134 having an outer wall 136 and a backwall 138. The diameter of the bore 132 is slightly larger than the diameter of the shaft 58 of the pin 56. A bearing assembly 140 having a retaining ring 142 and a plurality of spherical balls 144 located within the retaining ring 142 is located within the race 134 and adjacent the wheel 92. The pin 56 has its shaft 58 inserted through the bore 132 of the wheel 120 and through the retaining ring 142 of the bearing 140. The shaft 58 is then further inserted into the chamber 36 of the stem 34 until the bearing 140 is located adjacent the wheel 92. Each shaft 58 and its respective stem 34 constitute an axle 146 about which each of the wheels 78,92 and 120 independently rotate. The flange 70 of each pin 56 retains the wheels 78, 92 and 120 on their respective axles. The axles 52A and 52B respectively extend longitudinally through the center of each axle 146A and 146B. Each axle 146 is set at a 45° angle to the surface 14 however other angles may be used as desired.

As can be seen, each of the wheels 78,92 and 120 generally conform to the shape of a frustrum of a cone. Each of the radial surfaces 84,98 and 126 of the wheels 78,92 and 120 will simultaneously contact the surface 14 of a floor 12 as shown in FIG. 1. The wheels 78,92, and 120 are also located on the axles 146 such that the radial surfaces 84,98 and 126 lie in the surface of a single imaginary cone.

As the caster 10 moves along the floor 12, the wheels 78 will rotate at a first rotational speed, the wheels 92 will rotate at a second rotational speed which is faster than the rotational speed of the wheels 78, and the wheels 120 will rotate at a third rotational speed which is faster than the rotational speed of the wheels 92. As the diameter of each inner rim 86, 100 and 128 is only slightly larger in diameter than the adjacent outer rims 88, 102 and 130, as compared to the difference in diameter between the inner rim 86 of the first wheel 78 and the diameter of the outer rim 130 of the wheel 120, the wheels 78, 92 and 120 will minimize the amount of slipping or dragging that occurs as the caster 10 moves along the floor 12. The caster 10 also maintains a wide footprint due to the cumulative widths of each of the radial surfaces 84, 98 and 126.

While the bearings 72, 114 and 140 have been described as including spherical balls 76, 118 and 144 various other types of bearings may be used as desired. Alternative bearings may include antifriction devices such as teflon washers, cylindrical or radial bearings, or bearings of the type shown and described in U.S. patent application Ser. No. 07/634,443, filed Dec. 27, 1990, entitled Dual Wheel Tilted Axle Caster with an Integral Retainer and Bearing Assembly which is assigned to Shepherd Products U.S., Inc. The body 16, the pin 56 and each of the wheels 78, 92 and 120 are preferably made of plastic, however other materials may be used as desired.

While the present caster 10 has been shown and described as including three wheels 78, 92 and 120 located on each axle, the caster 10 may alternatively include only two wheels located on each axle or more than three wheels may be located on each axle. The more individual wheels which are utilized the less scuffing occurs.

Various features of the invention have been particularly shown and described in connection with the illustrated embodiments of the invention, however, it must be understood that these particular arrangements merely illustrate, that the invention must be given its fullest interpretation within the terms of the appended claims.

What is claimed is:

1. A caster including a body having a first axle and a second axle, said first axle being disposed at an angle to said second axle and said first and second axles being disposed at acute angles to a ground surface; a first wheel mounted for rotation about said first axle; a second wheel also mounted for rotation about said first axle, said second wheel being relatively rotatable with respect to said first wheel and located outwardly from said first wheel; a third wheel mounted for rotation about said second axle; and a fourth wheel also mounted for rotation about said second axle, said fourth wheel being relatively rotatable with respect to said third wheel and located outwardly from said third wheel; each said wheel including an outer rim, an inner rim larger in diameter than said outer rim and a tapered ground engaging surface extending substantially the entire thickness of said wheel between said inner rim and said outer rim, said ground engaging surface being adapted for rolling engagement with the ground surface.

2. The caster of claim 1 additionally including antifriction means located between said first wheel and said body and between said third wheel and said body for facilitating relative rotation between said first and third wheels and said body.

3. The caster of claim 2 wherein said antifriction means includes a bearing assembly.

4. The caster of claim 1 additionally including antifriction means located between said first wheel and said second wheel and between said third wheel and said fourth wheel to facilitate relative rotation therebetween.

5. The caster of claim 4 wherein said antifriction means includes a bearing assembly.

6. The caster of claim 1 wherein the diameter of said inner rim of said first wheel and said third wheel is larger than the diameter of said inner rim of said second wheel and said fourth wheel.

7. The caster of claim 1 wherein the diameter of said outer rim of said first wheel and said third wheel is larger than the diameter of said inner rim of said second wheel and said fourth wheel.

8. The caster of claim 1 wherein all of said wheels are in the general shape of a frustrum of a cone.

9. The caster of claim 1 wherein a horizontal plane intersects a portion of said tapered radial surface of each said wheel.

* * * * *